US009168476B2

(12) United States Patent  (10) Patent No.: US 9,168,476 B2
Castro et al.  (45) Date of Patent: Oct. 27, 2015

(54) AIR FILTER COMPRISING A MICROPERFORATED FILM, AND METHOD OF USING

(71) Applicant: 3M INNOVATIVE PROPERTIES COMPANY, St. Paul, MN (US)

(72) Inventors: Gustavo H. Castro, Cottage Grove, MN (US); Stephen M. Sanocki, Hudson, WI (US); David F. Slama, City of Grant, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 50 days.

(21) Appl. No.: 14/051,596

(22) Filed: Oct. 11, 2013

(65) Prior Publication Data

US 2015/0101486 A1   Apr. 16, 2015

(51) Int. Cl.
  *B01D 46/00* (2006.01)
  *B01D 46/52* (2006.01)
  *B01D 46/10* (2006.01)

(52) U.S. Cl.
  CPC ........ *B01D 46/0023* (2013.01); *B01D 46/0026* (2013.01); *B01D 46/0032* (2013.01); *B01D 46/10* (2013.01); *B01D 46/521* (2013.01); *B01D 2239/065* (2013.01); *B01D 2265/06* (2013.01); *B01D 2275/10* (2013.01)

(58) Field of Classification Search
  CPC ..................... B01D 46/0026; B01D 2239/065; B01D 2239/0654; B01D 2275/10; B01D 46/0023; B01D 46/0032; B01D 2265/06
  USPC ........................................... 55/486, 499, 501
  See application file for complete search history.

(56) References Cited

U.S. PATENT DOCUMENTS

| | | |
|---|---|---|
| 2,965,197 A | 12/1960 | Dow |
| 3,003,581 A | 10/1961 | Greason |
| 4,917,942 A | 4/1990 | Winters |
| 5,709,829 A | 1/1998 | Giacometti |
| 6,322,604 B1 | 11/2001 | Midkiff |
| 6,570,492 B1 | 5/2003 | Peratoner |
| 6,579,350 B2 | 6/2003 | Doherty |
| 6,598,701 B1 | 7/2003 | Wood |
| 6,617,002 B2 | 9/2003 | Wood |
| 6,858,297 B1 | 2/2005 | Shah |
| 6,977,109 B1 | 12/2005 | Wood |
| 7,503,953 B2 | 3/2009 | Sundet |
| 7,677,454 B2 | 3/2010 | Gelbman |
| 7,728,811 B2 | 6/2010 | Albert |
| 2003/0230062 A1 | 12/2003 | Kubokawa |
| 2005/0204714 A1 | 9/2005 | Sundet |
| 2009/0044702 A1 | 2/2009 | Adamek |
| 2009/0078119 A1 | 3/2009 | Buckley |
| 2010/0177749 A1 | 7/2010 | Essinger et al. |
| 2012/0244314 A1 | 9/2012 | Scheibner et al. |
| 2013/0327004 A1 | 12/2013 | Lise |

FOREIGN PATENT DOCUMENTS

| | | |
|---|---|---|
| WO | WO 01-19528 | 3/2001 |
| WO | WO 2009-075032 | 6/2009 |
| WO | WO 2011-081894 | 7/2011 |

OTHER PUBLICATIONS

International Search Report, PCT/US2014/059232, mailed Jan. 15, 2015, 3 pages.

*Primary Examiner* — Robert Clemente
(74) *Attorney, Agent, or Firm* — Kenneth B. Wood

(57) ABSTRACT

Filter media including a microperforated film with tapered microperforations, and a nonwoven web positioned upstream of the microperforated film. Framed air filters incorporating such filter media, and methods of using such filter media.

18 Claims, 5 Drawing Sheets

AIR FILTER COMPRISING A MICROPERFORATED FILM, AND METHOD OF USING

BACKGROUND

Filter media are often used e.g. to filter particulates from moving air streams. Such filter media are often comprised of fibrous materials, e.g. nonwoven webs.

SUMMARY

In broad summary, herein is disclosed a filter media comprised of a microperforated film comprising tapered microperforations, and a nonwoven web positioned on the upstream side of the microperforated film. Also disclosed are framed air filters comprising such filter media, and methods of using such filter media. These and other aspects will be apparent from the detailed description below. In no event, however, should this broad summary be construed to limit the claimable subject matter, whether such subject matter is presented in claims in the application as initially filed or in claims that are amended or otherwise presented in prosecution.

Like reference numbers in the various figures indicate like elements. Some elements may be present in identical or equivalent multiples; in such cases only one or more representative elements may be designated by a reference number but it will be understood that such reference numbers apply to all such identical elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated.

Although terms such as "top", "bottom", "upper", "lower", "under", "over", "front", "back", "up" and "down", and "first" and "second" may be used in this disclosure, it should be understood that those terms are used in their relative sense only unless otherwise noted. As used herein as a modifier to a property, attribute or relationship, the term "generally", unless otherwise specifically defined, means that the property, attribute or relationship would be readily recognizable by a person of ordinary skill but without requiring absolute precision or a perfect match (e.g., within +/−20% for quantifiable properties); the term "substantially" means to a high degree of approximation (e.g., within +/−10% for quantifiable properties) but again without requiring absolute precision or a perfect match.

The term "upstream" denotes the side and face of a framed air filter and/or filter media that faces the incoming air stream in an air handling system (e.g., a residential HVAC system). The term "downstream" is used to denote the side and face through which filtered air exits the filter media. The term "diameter" (e.g. of an opening such as a microperforation) as used herein is specifically defined as encompassing the "equivalent diameter" in the case of a non-circular (e.g., square, irregular, etc.) shape (the equivalent diameter being the diameter of a circle that would have the same area as the non-circular shape in question). As used herein, the term "microperforation" denotes an opening that extends entirely through a film from one major surface to the other major surface (so as to allow airflow therethrough), and that comprises a diameter, at its narrowest point, of from 10 microns to 1000 microns.

DETAILED DESCRIPTION

Figure 1:
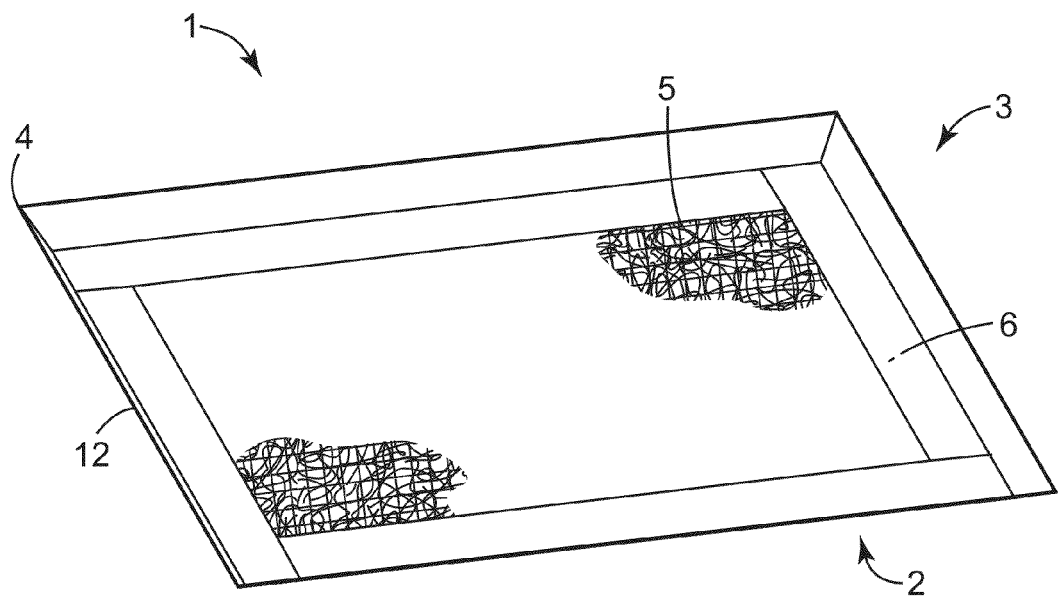
FIG. 1 is a perspective view of an exemplary framed air filter as disclosed herein, viewed from the downstream side of the framed air filter.

Shown in FIG. 1 in perspective view from the downstream side is an exemplary framed air filter 1 as disclosed herein. Air filter 1 comprises an upstream side 2 and a downstream side 3 (which designations may be specified by an informational indicia provided on air filter 1), as depicted in FIG. 1 and as defined above. Air filter 1 comprises air filter media 5 and frame 12 mounted generally on, and surrounding, perimeter 6 of filter media 5. Air filter 1 may be rectangular in shape (which specifically includes square shapes) with corners 4, with filter media 5 thus having a generally rectangular perimeter 6 (which does not preclude irregularities, notches, chamfered or angled corners, or the like, in perimeter 6 of filter media 5). Frame 12 may thus take the form of a rectangular frame with four major elongate frame portions that are each mounted on one of the four major edges of the filter media and with neighboring frame portions meeting to form corners 4 of frame 12 as shown in FIG. 1.

Figure 2:
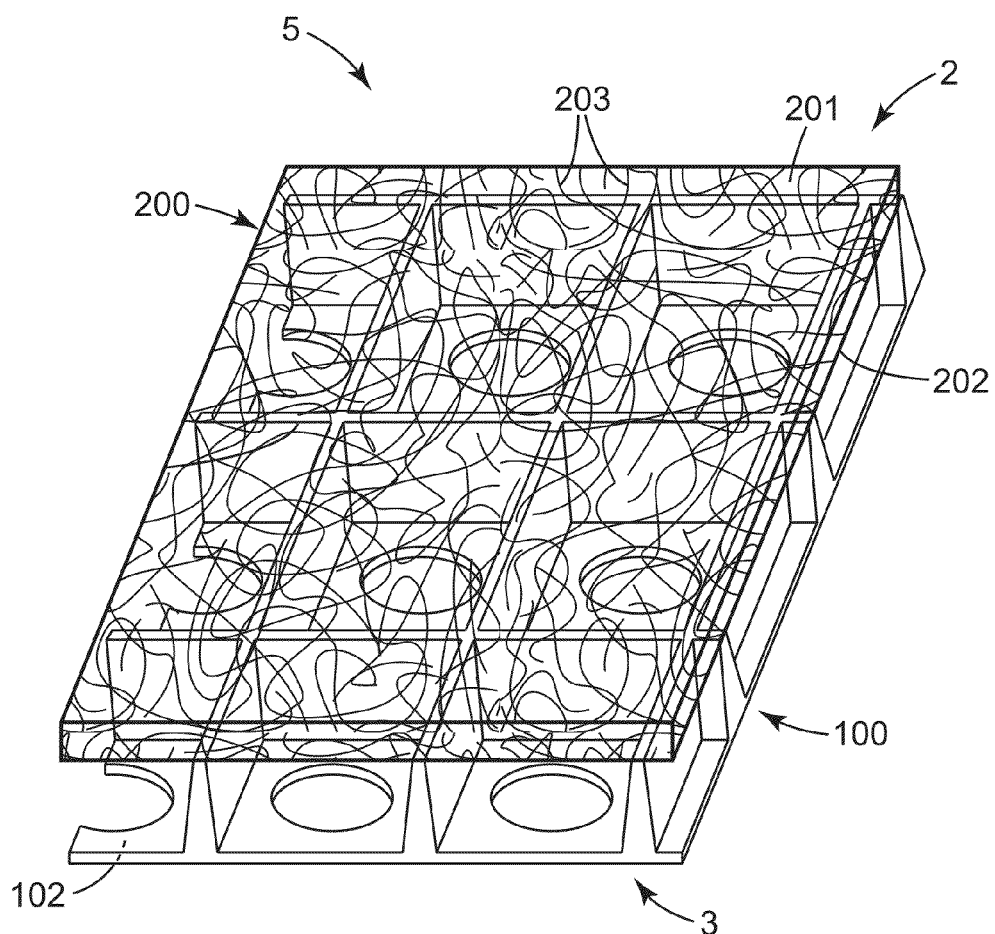
FIG. 2 is a perspective view of a portion of an exemplary air filter media as disclosed herein, viewed from the upstream side of the air filter media.

A portion of an exemplary air filter media 5 is shown in further detail in FIG. 2. Air filter media 5 is comprised of microperforated film 100 (shown in further detail in FIG. 3), which film comprises a first, upstream face 101 and a second, downstream face 102, and which comprises a plurality of tapered microperforations 104 that extend through film 100 from first face 101 to second face 102 and which allow the passage of air through the film. At least some of the microperforations are tapered so as to have a wide end with a relatively large diameter and a narrow end with a relatively small diameter. As disclosed herein, microperforated film 100 is oriented so that the wide ends of the microperforations are provided on first, upstream face 101 (that is, so as to face the incoming airstream when placed into e.g. an air-handling passage of an HVAC system) and the narrow ends of the microperforations are provided on second, downstream face 102 so that filtered air exits filter media 5 therethrough.

Air filter media 5 further comprises nonwoven web 200, which is positioned upstream of microperforated film 100 (so that any incoming air must pass through web 200 before passing through film 100) with first, downstream face 202 facing microperforated film 100 (and with at least some portions of some fibers 203 of web 200 being in contact with first, upstream face 101 of film 100) and with second, upstream face 201 facing the incoming air stream.

As detailed in the Working Examples herein, it has been unexpectedly found that the configuring of this type of air filter media with the wide ends of the microperforations of the microperforated film facing upstream, and with a nonwoven web positioned upstream of the microperforated film, can allow the two layers (the microperforated film and the nonwoven web) to work together synergistically to provide enhanced filtration performance, as evidenced e.g. by Arrestance and Dust Holding Capacity data provided in the Examples herein.

Figure 3:
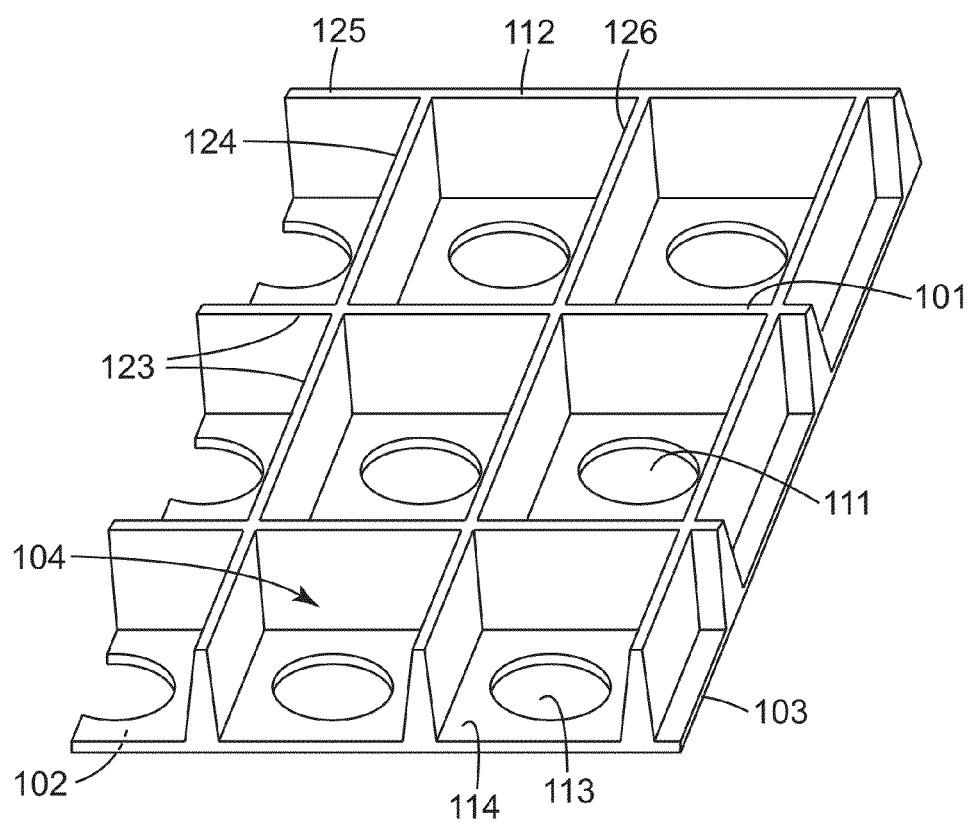
FIG. 3 is a perspective view of a portion of an exemplary microperforated film as disclosed herein, viewed from the upstream side of the microperforated film.

A portion of an exemplary microperforated film 100 is shown in isolated perspective upstream view in FIG. 3 (with nonwoven web 200 of FIG. 2 having been omitted for ease of viewing features of microperforated film 100). Microperforated film 100 comprises first, upstream face 101 and second, downstream face 102. As noted above, microperforated film 100 comprises a plurality of tapered microperforations 104 that extend through the film 100 from first face 101 to second face 102. Tapered microperforations 104 comprise a wide end 112 and a narrow end 111, with the terms wide and narrow being defined as meaning that, for a given microperforation, the wide end thereof comprises a diameter (or equivalent diameter, as noted above) that is at least about 110% of the diameter or equivalent diameter of the narrow end.

In designs of the general type illustrated in FIG. 3, a narrow end 111 of a microperforation 104 may take the form of a "throat" 113 at least partially defined by (e.g., at least partially circumferentially surrounded by) a flange 114 (which flange may comprise a thickness that is less than e.g. 20, 10, or 5% of the total thickness of microperforated film 100). Designs of this general type may be conveniently made by e.g. embossing or extrusion-embossing a film to comprise dead-end cavities terminated by a base layer 103, and then performing a partial melting step (e.g., by flame treatment, or in general by any suitable thermal treatment that can provide e.g. a short-lived, high heat flux) to displace at least a portion of the base layer in at least some of the dead-end cavities to produce throats 113. Such microperforations may thus exhibit a "stepped" diameter when viewed in cross section. That is, in some embodiments a microperforation 104 may comprise a first portion (e.g., a "pocket") that is proximate first face 101 and that exhibits a relatively large diameter, and a second portion (e.g., a "throat") with a relatively small diameter, and with a relatively well-defined step change between the two. It will be appreciated that the diameter of throat 113 may depend on the amount to which base layer 103 is displaced. In some embodiments, the displacement may be quite aggressive (so that flange 114 takes the form of a very narrow lip or may even not be apparent).

Regardless of the presence or absence of a throat 113, walls 123 which define at least the first portion of microperforations, may comprise a slope so as to provide at least some portion of the taper exhibited by the microperforations. Sloped walls 123 are shown in exemplary embodiment in FIG. 3. FIG. 3 furthermore illustrates an embodiment in which walls 123 that define at least first portions of microperforations 104 are provided by a first set of parallel ribs 124 and a second set of parallel ribs 125, which sets of ribs collectively provide walls 123. Such ribs (or walls of any type) may comprise upstream faces (tops) 126 that collectively provide the upstream face of microperforated film 100. It is noted that walls 123 that define microperforations 104 can be provided in any suitable geometry and may provide at least first portions of microperforations 104 that are in the form (when viewed e.g. from an upstream direction) of e.g. diamonds, hexagons, octagons, circles, and so on. It will further be appreciated that, if present, throats 113 may take any shape (e.g., generally circular, oval, square, irregular, and so on).

In various embodiments, the area density of microperforations 104 in film 100 may be at least about 155, 310, 465, or 620 microperforations per square centimeter (1000, 2000, 3000, or 4000 microperforations per square inch). In further embodiments, the area density of microperforations 104 in film 100 may be at most about 1550, 1240, 1085, 930, or 775 microperforations per square centimeter (10000, 8000, 7000, 6000, or 5000 microperforations per square inch). The microperforations may be provided on a generally square array (as in FIG. 3), in a hexagonal array, or in any desired pattern, whether irregular or regular.

In various embodiments, the diameter of wide ends 112 of microperforations 104 may be at least about 100, 200, 300, or 400 microns. In further embodiments, the diameter of wide ends 112 of microperforations 104 may be at most about 800, 600, 500, or 400 microns. In various embodiments, the diameter of narrow ends 111 of microperforations 104 may be at least about 50, 100, 150, 200, 250, or 300 microns. In further embodiments, the diameter of narrow ends 111 of microperforations 104 may be at most about 600, 500, 400, or 300 microns. (Whatever the absolute values of the diameters of the narrow and wide ends may be, they will obey the above-noted definition of a tapered microperforation, i.e. the diameter of the wide ends will be at least about 110% of the diameter of the narrow end (noting however that other microperforations may be present that are not tapered.) In various embodiments, wide ends 112 of microperforations 104 may comprise a diameter that is at least about 120, 140, 160, 180, or 200% of the diameter of the narrow ends. In further embodiments, wide ends 112 of microperforations 104 may comprise a diameter that is at most about 400, 300, 200, or 160% of the diameter of the narrow ends.

In various embodiments, the percent open area provided by the wide ends 112 of microperforations 104, may be at least about 50, 60, 70, 80, or 90%. In further embodiments, the percent open area provided by the wide ends 112 of microperforations 104, may be at most about 95, 90, 85, 80, or 70%. In various embodiments, the percent open area provided by the narrow ends 111 of microperforations 104, may be at least about 20, 30, 40, or 50%. In further embodiments, the percent open area provided by the narrow ends 111 of microperforations 104, may be at most about 70, 60, 50, or 40%. In various embodiments, the ratio of the open area provided by the wide ends to the open area provided by the narrow ends, may be at least about 1.2, 1.5, 2.0, or 2.5. In various embodiments, the ratio of the open area provided by the wide ends to the open area provided by the narrow ends, may be at most about 5.0, 4.0, 3.0, or 2.5.

In various embodiments, the slope of walls 123 of microperforations 104 may be at least about 4, 6, 8 or 10 degrees (such a slope can be measured relative to an axis that is perpendicular to the local major plane of film 100). In further embodiments, the slope of walls 123 of microperforations 104 may be at most about 16, 12, 10, or 8 degrees. Such a slope can be relatively constant (e.g., as with walls 123 of FIG. 3) or can vary along the upstream-downstream axis of microperforations 104.

In various embodiments, the thickness of microperforated film 100 may be at least about 50, 100, or 150 microns. In further embodiments, the thickness of microperforated film 100 may be at most about 500, 400, 300, or 200 microns. (Such a thickness would be, for example for the exemplary film of FIG. 3, the distance along the upstream-downstream axis from the most-upstream point of upstream face 101 to the most-downstream point of downstream face 102.)

Regardless of the specific geometry of the individual microperforations (and the presence or absence of any throat portion thereof) and their arrangement, the term microperforated film by definition does not encompass any layer (e.g., sheet-like article) in which fibers, filaments, etc., are arranged or produced (e.g. by weaving, knitting, by a non-woven operation, and/or by a stretching/fibrillation operation) to form a layer with channels running therethrough. Nor does it encompass any film in which pores are produced by conventional membrane-forming operations (e.g., solvent-phase inversion, thermal inversion, and so on).

Nonwoven web 200 as shown in exemplary embodiment in FIG. 2 may be any suitable nonwoven web. In particular, it has been found that the advantageous filtration effects disclosed herein, may be found even with nonwoven webs that are very open and highly porous, and that may not normally be thought of as exhibiting an enhanced ability to perform filtration (as noted above, the combination of such nonwoven webs with a microperforated film, in the orientation disclosed herein, appears to provide particularly beneficial properties).

The openness of such a web can be characterized in one aspect in terms of "solidity". By solidity is meant a dimensionless fraction (usually reported in percent) that denotes the proportion of the total (overall) volume of a fibrous web that is occupied by the solid (e.g. polymeric fibrous) material of the web. Further explanation, and methods for obtaining solidity, are found in the Examples section. (The term "loft" is also often used to characterize nonwoven webs; loft is 100% minus solidity and denotes the proportion of the total (overall) volume of the web that is unoccupied by solid material; e.g., that is occupied by air.) In various embodiments, nonwoven web 200 may comprise a solidity of less than about 10, 8, 6, 4, or 3%. In further embodiments, nonwoven web 200 may comprise a solidity of more than about 1, 2, 2.5, or 3%.

The openness of nonwoven web 200 can be characterized in another aspect in terms of "area coverage". By area coverage is meant the percentage of the area of the web that is blocked by fibers of the web so that straight, line-of-sight passage through the web (specifically, through the shortest dimension of the web along a direction perpendicular to the major plane of the web) is not possible along those paths. In practical terms, the area coverage provided by a nonwoven web can be estimated by placing the web atop a substrate and noting (e.g., via inspection with an optical microscope) the area of the substrate that is blocked from view by one or more fibers of the web. The ratio of the area of the substrate that is blocked from view, to the total area surveyed, is the area coverage that is imparted by the web. (It will be appreciated that the area coverage will be affected e.g. by the solidity of the web and the thickness of the web; it will be further appreciated that many nonwoven webs will exhibit an area coverage of greater than 90%, e.g. approaching 100%.)

Figure 4:
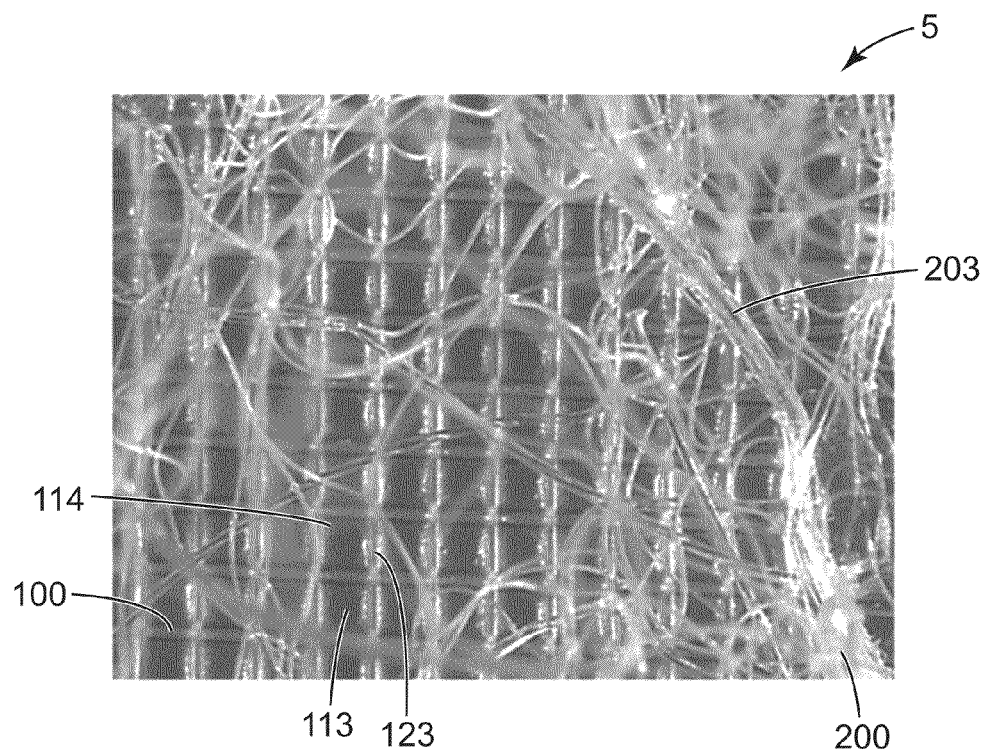
FIG. 4 is an optical photomicrograph of an exemplary air filter media as disclosed herein, viewed from the upstream side of the air filter media.
Figure 5:
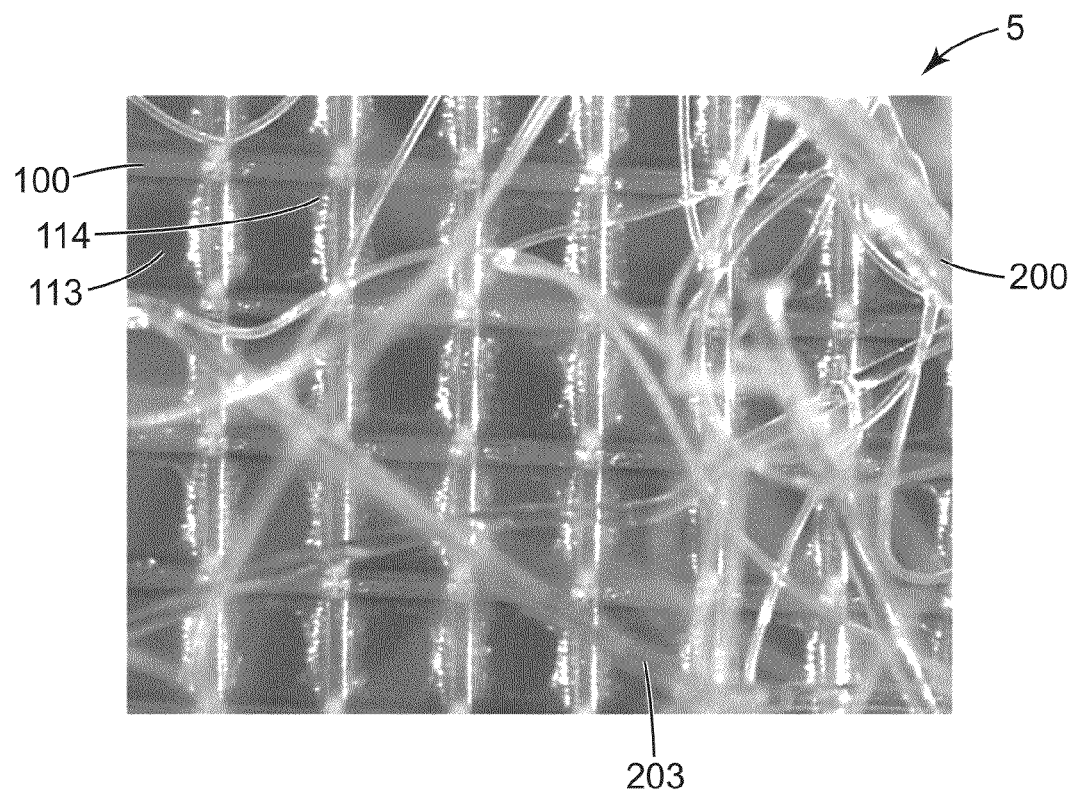
FIG. 5 is another optical photomicrograph of an exemplary air filter media as disclosed herein, viewed from the upstream side of the air filter media.

In FIGS. 4 and 5, which are optical micrographs, viewed from the upstream side, of exemplary filter media of the general type shown in FIG. 2, it can be clearly seen that large areas of microperforated film 100 are visible through the spaces between the individual fibers 203 of nonwoven web 200. Thus, the exemplary nonwoven web 200 shown in these Figs. exhibits a relatively low area coverage (in comparison to e.g. nonwoven webs that comprise a very high density of fibers per unit volume, and/or are very thick). In various embodiments, the area coverage (e.g., of microperforated film 100) that is provided by nonwoven web 200 may be at most about 70, 60, or 50%. In further embodiments, the area coverage of microperforated film 100 that is provided by nonwoven web 200 may be at least about 10, 20, or 30%.

In still another aspect, in some embodiments nonwoven web 200 may comprise a relatively low area density; that is, weight per unit area as reported in e.g. grams per square meter. In various embodiments, nonwoven web 200 may exhibit an area density of at most about 60, 50, 40, or 30 grams per square meter. In further embodiments, nonwoven web 200 may exhibit a area density of at least about 10, 15, 20, 25, or 30 grams per square meter.

In still another aspect, in some embodiments nonwoven web 200 may be comprised of relatively large fibers. In various embodiments, the fibers 203 of nonwoven web 200 may comprise an average diameter of at least about 10, 20, or 30 microns. In further embodiments, the fibers 203 of nonwoven web 200 may comprise an average diameter of at most about 200, 100, or 80 microns.

From the above discussions it is clear that a nonwoven web 200 may advantageously be used (in combination with microperforated film 100) that e.g. comprises any or all of a low solidity, a low area coverage, a low area density, and/or a large average fiber diameter. The ordinary artisan will appreciate that nonwoven webs with any or all of these characteristics may be made (by any of numerous available processes) that are very inexpensive and durable and that are thus particularly advantageous for e.g. high-volume uses such as e.g. residential air filters. It will be appreciated however that a nonwoven web may not necessarily need to exhibit a particular combination of all of these parameters to be useful as disclosed herein.

Microperforated film 100 and nonwoven web 200 may be comprised of any suitable material, e.g. organic polymeric material. In various embodiments, they may be made of organic polymeric materials that each comprise at least one ingredient chosen to facilitate melt-bonding of nonwoven web 200 to microperforated film 100. For example, each may comprise some amount of a polyolefin (e.g., polypropylene, polyethylene, and so on). It is emphasized however that any suitable material (e.g. of a wide variety of materials that may be e.g. melt processable into films and/or processable into nonwoven webs) may be used as desired. Copolymers, blends, and so on, may be used as desired. (In particular, at least some fibers of the web may be multi-component fibers (such as e.g. core-sheath bicomponent fibers) with at least one component chosen to facilitate melt-bonding.) Any such material may further comprise any additive as suitable for any desired purpose. Such additives might include e.g. processing aids, antioxidants, plasticizers, pigments, stabilizers, mineral fillers, impact modifiers, flame-resistance additives, and so on. In particular, the nonwoven web may also comprise e.g. binders or the like to facilitate bonding of the fibers of the web to each other and/or to the microperforated film. The nonwoven web may further comprise performance-enhancing additives such as those designed to provide removal of odorous or noxious gases (e.g., activated carbon and the like, various catalysts such as gold catalysts which may facilitate the removal of carbon monoxide, and so on).

Any suitable process may be used to produce microperforated film 100; likewise, any suitable process may be used to produce nonwoven web 200. As mentioned earlier, in some embodiments microperforated film 100 may be produced by e.g. embossing or extrusion-embossing a thermoplastic film with a base layer that provides dead-end cavities and then displacing at least portions of the base layers by way of e.g. a thermal treatment such as e.g. flame treatment. Some such processes are described in detail in U.S. Patent Application Publication 2012/0244314 to Scheibner, which is incorporated by reference in its entirety. However, any suitable method of providing a microperforated film as disclosed herein may be used.

Nonwoven web 200 may be produced by any suitable process. In various embodiments, nonwoven web 200 may be e.g. a carded web, an air-laid web, a spun-bonded web, a spun-laced web, a melt-blown web, and so on. In particular embodiments, nonwoven web 200 may be a multilayer web, e.g. a so-called spunbond-meltblown-spunbond (SMS) web or the like. The fibers of nonwoven web 200 may be arranged (whether by bonding fibers to each other and/or physically entangling fibers with each other, or some combination thereof) to form e.g. a handleable web by way of melt-bonding, adhesive bonding, needle-punching, stitch-bonding, and so on, as desired.

Nonwoven web 200 may be positioned upstream of microperforated film 100 to form filter media 5 in any desired manner. In some embodiments, a first, downstream face 202 of web 200 may be bonded (whether by melt bonding, adhesive bonding, ultrasonic welding, and so on). to first, upstream face 101 of microperforated film 100, to form filter media 5. In certain embodiments, fibers 203 may not necessarily take the form of a handleable web (e.g., that can be processed with conventional web-handling equipment) prior to their being provided on the upstream face of microperforated film 100; rather, nonwoven web 200 may be formed in-situ from fibers e.g. by way of a flocking process.

Figure 7:
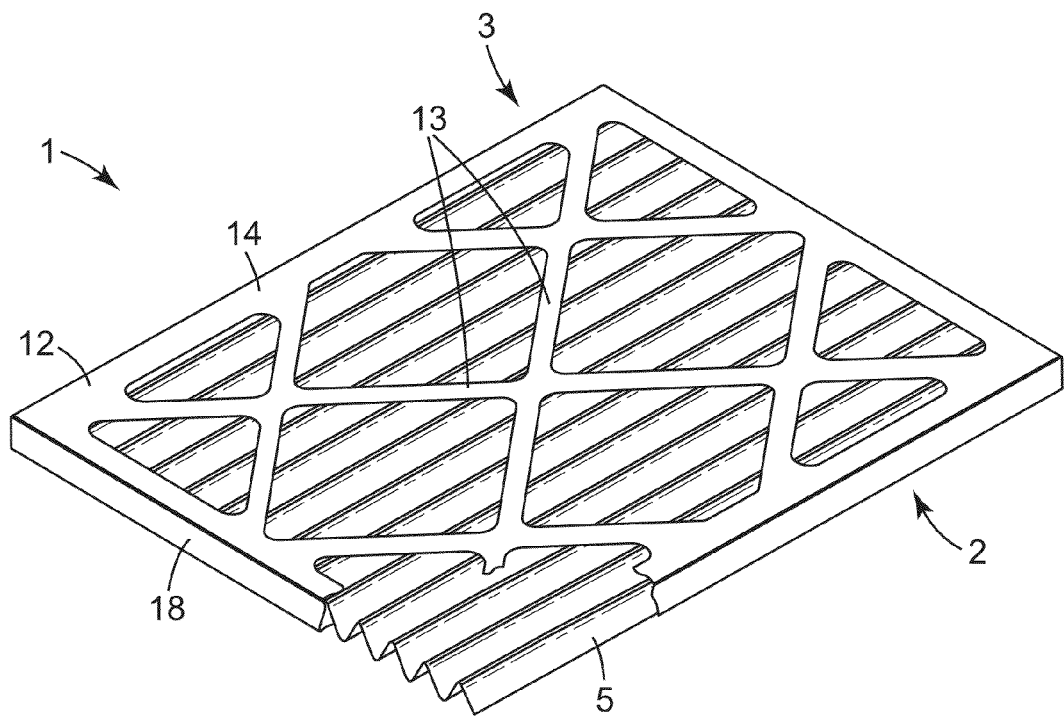
FIG. 7 is a perspective view of another exemplary framed air filter as disclosed herein, viewed (in partial cutaway) from the downstream side of the framed air filter.
Figure 8:
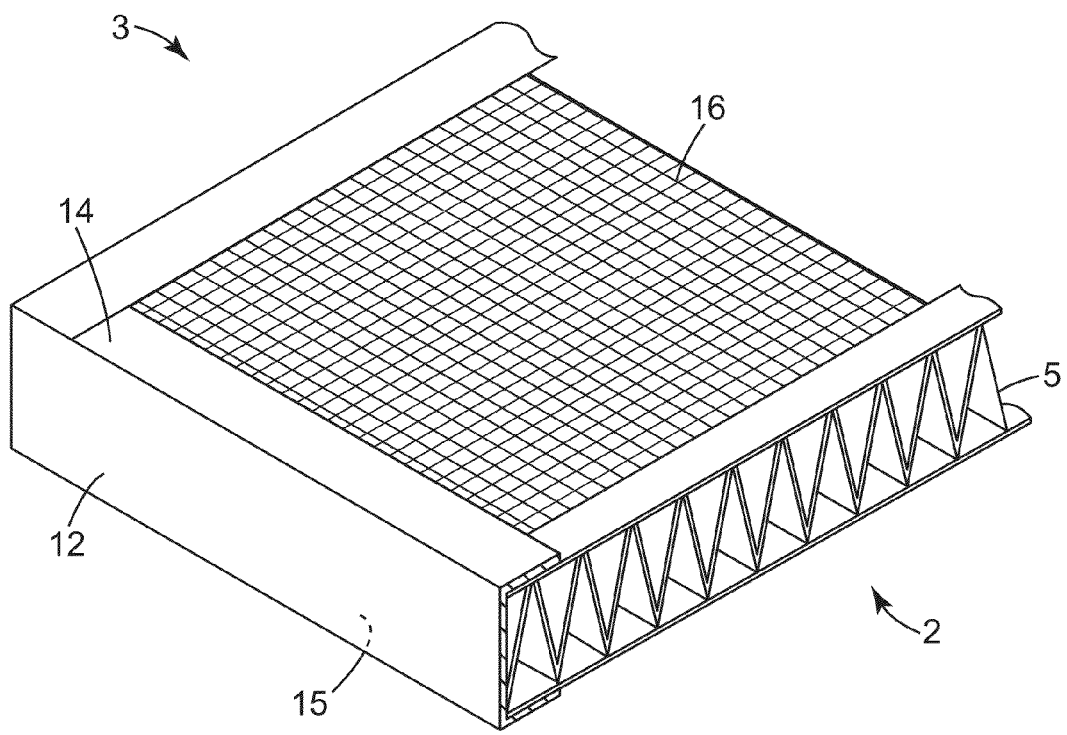
FIG. 8 is a perspective view of another exemplary framed air filter as disclosed herein, viewed (in partial cutaway) from the downstream side of the framed air filter.
Figure 9:
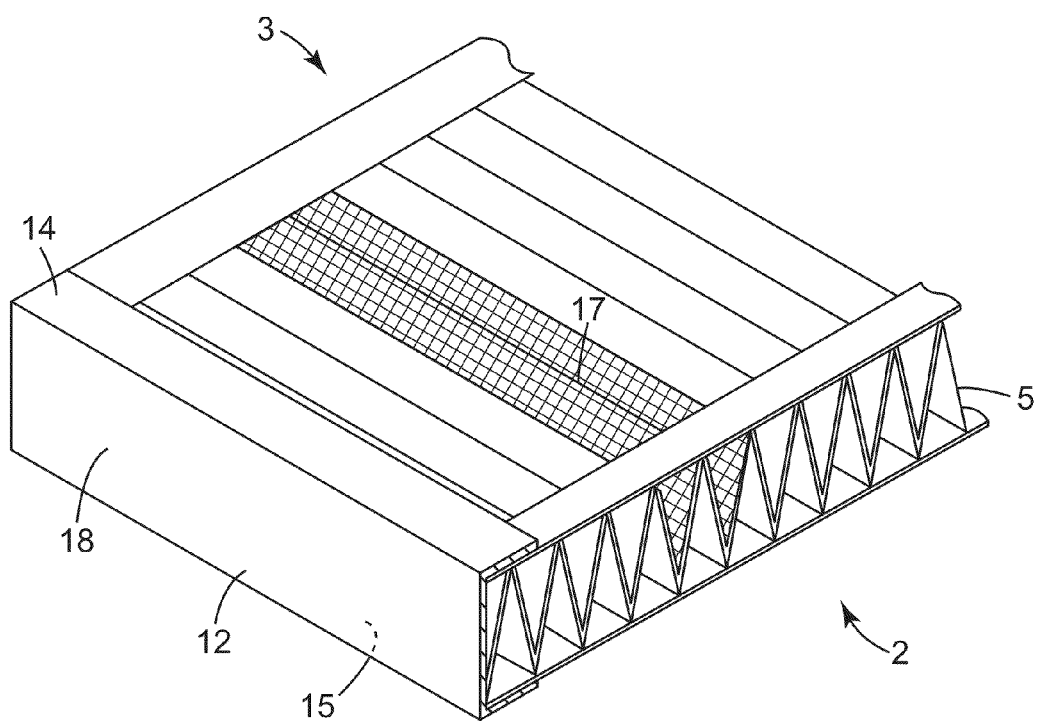
FIG. 9 is a perspective view of another exemplary framed air filter as disclosed herein, viewed (in partial cutaway) from the downstream side of the framed air filter.

However produced, a piece of filter media 5 can be obtained (e.g., in the form of a rectangle) and a perimeter frame 12 can be applied around the perimeter thereof in any desired manner. The particular exemplary embodiment of FIG. 1 shows a frame 12 that is a so-called "pinch" frame, which frame 12 is also angled (which may allow multiple framed filters 1 to be nested with each other if desired). However, other designs and configurations are possible. FIGS. 7-9 show exemplary embodiments using a perimeter frame 12 that is a so-called "channel" frame, which comprises a generally U-shaped structure comprising upstream and downstream flanges 14 and 15 that are each connected to a sidewall 18 with flanges 14 and 15 being spaced apart in the upstream-downstream direction by approximately the width of sidewall 18.

The designs of FIGS. 7-9 also differ from FIG. 1 in depicting filter media 5 that is pleated so as to have rows of generally oppositely-facing pleats. Such a configuration may be conveniently produced e.g. by bonding nonwoven web 200 to microperforated film 100 to form a multilayer laminate, and then pleating the laminate to form pleated filter media 5 (e.g., so that film 100 and web 200 are co-pleated layers). Any suitable method of pleating may be used, which may produce relatively sharp-edged pleats (e.g. as shown in FIGS. 8 and 9), or relatively rounded pleat edges (as shown in FIG. 7). If desired, a filter media 5 (whether pleated or not) may comprise small-scale undulations, scallops, texture, or the like, rather than being locally planar (between the pleat lines) as shown in FIGS. 8 and 9.

FIG. 7 further shows an exemplary design in which one or more support members 13 are provided on the downstream side of filter media 5, which support members 13 are attached to frame 12 (and may be integral therewith as shown in FIG. 7). FIG. 8 further shows an exemplary design in which a generally planar support grid (which might be e.g. a metal mesh, a non-woven scrim, a multiplicity of filaments, and so on) 16 is provided on the downstream side of filter media 5. FIG. 9 still further shows an exemplary design in which a support grid (which might be e.g. a metal mesh, non-woven scrim, and so on, that is attached to a face of filter media 5) 17 is pleated along with filter media 5. The ordinary artisan will appreciate that any of these features may be used particularly with pleated filter media 5, to support the media and thus to minimize any tendency of the pleats to unacceptably deform (e.g., billow, collapse, and so on) under the air pressures typically encountered e.g. in a residential HVAC system. It may be convenient to provide any of these features (e.g., features 13, 16 and/or 17) on the downstream side of filter media 5. In such case, at least some of these features (e.g., support members 13) may not necessarily need to be bonded to any portion of filter media 5. However, if desired, any of these features may be bonded (e.g., adhesively bonded) to filter media 5, in which case such features might be provided on the upstream side of filter media 5 (in addition to, or in place of, any such features being provided on the downstream side of filter media 5).

In some embodiments, frame 12 may be comprised of four major elongate frame portions that are each provided by an individual frame piece that is mounted on one of the four major edges of the filter media, with neighboring frame pieces being attached to each other to form frame 12. In various embodiments, any number of such frame pieces (meeting at any suitable location, whether at a corner 4 of the filter media, or partway along a side of the filter media) can be used. In particular embodiments, a single integral piece can be used to form frame 12 (as in the exemplary embodiment of FIG. 7).

In some embodiments, filter media 5 may comprise an informational indicia upon a major surface thereof. In specific embodiments, such an indicia may be printed on a major face of microperforated film 100. It will be appreciated that such a film may be more straightforward to print on, and/or may display a much sharper and crisper image, than e.g. a non-woven web. Such an informational indicia might comprise e.g. a logo, trade designation, or the like (whether such indicia is in the form of text, or a symbol or picture, or a mixture of both). Either film 100 and/or web 200 may also be dyed or pigmented, as desired for any optical and/or decorative effect. In various embodiments, filter media 5 and/or frame 12 may comprise one or more informational indicia indicating the upstream face and side of the framed air filter, and/or one or more informational indicia indicating the downstream face and side of the framed air filter.

In some embodiments, either microperforated film 100 and/or nonwoven web 200 may be charged using any well-known method (e.g., hydrocharging) so that the material of film 100 and/or web 200 is an electret material. Such charging could be done of either layer prior to their being assembled together, of could be performed on both layers as a unit. Charging additives could be included in the materials of which one or both layers are made, as is well known. In some embodiments, filter media 5 may be used as a prefilter through which moving air passes immediately prior to entering an additional filter media. In other embodiments, filter media 5 is the only filter media that is used, with no other filter media being present. It is also noted that although a perimeter frame 12 may be conveniently used in many applications, in some embodiments filter media 5 as disclosed herein may be used in the absence of any such frame.

List of Exemplary Embodiments

Embodiment 1 is a framed air filter comprising a filter media with an upstream side and a downstream side and a perimeter, wherein the filter media comprises: a microperforated film comprising a first, upstream face and a second, downstream face and comprising a plurality of tapered microperforations extending through the microperforated film from the first, upstream face to the second, downstream face, wherein the tapered microperforations comprise a wide end at the first, upstream face of the microperforated film and a narrow end at the second, downstream face of the microperforated film and wherein the wide ends of the tapered microperforations collectively provide the first, upstream face of the microperforated film with a % open area of from about 50% to about 95%; and, a nonwoven web positioned on the first, upstream face of the microperforated film with a first, downstream face of the nonwoven web in contact with the first, upstream face of the microperforated film, wherein the nonwoven web exhibits an area coverage of from about 10% to about 70%, and wherein the nonwoven web exhibits a solidity of from about 1% to about 10%, and, a support frame surrounding the perimeter of the filter media.

Embodiment 2 is the framed air filter of embodiment 1, wherein the wide ends of the tapered microperforations collectively provide the first, upstream face of the microperforated film with a % open area of from about 60%, to about 90%. Embodiment 3 is the framed air filter of embodiment 1, wherein the wide ends of the tapered microperforations collectively provide the first, upstream face of the microperforated film with a % open area of from about 70%, to about 90%. Embodiment 4 is the framed air filter of any of embodiments 1-3, wherein the narrow ends of the tapered microperforations collectively provide the second, downstream face of the microperforated film with a % open area of from about 20% to about 70%. Embodiment 5 is the framed air filter of any of embodiments 1-3, wherein the narrow ends of the tapered microperforations collectively provide the second, downstream face of the microperforated film with a % open area of from about 30% to about 60%. Embodiment 6 is the framed air filter of any of embodiments 1-5, wherein the plurality of tapered microperforations are present in the microperforated film at a density of from about 155 microperforations per square cm to about 1550 microperforations per square cm. Embodiment 7 is the framed air filter of any of embodiments 1-5, wherein the plurality of tapered microperforations are present in the microperforated film at a density of from about 310 microperforations per square cm to about 1240 microperforations per square cm.

Embodiment 8 is the framed air filter of any of embodiments 1-7 wherein the nonwoven web exhibits a area density of from about 10 grams per square meter to about 50 grams per square meter. Embodiment 9 is the framed air filter of any of embodiments 1-8 wherein the nonwoven web exhibits an average fiber diameter of from about 10 microns to about 200 microns. Embodiment 10 is the framed air filter of any of embodiments 1-8 wherein the nonwoven web exhibits an average fiber diameter of from about 20 microns to about 100 microns. Embodiment 11 is the framed air filter of any of embodiments 1-8 wherein the nonwoven web exhibits an average fiber diameter of from about 30 microns to about 80 microns. Embodiment 12 is the framed air filter of any of embodiments 1-11 wherein the nonwoven web exhibits an area coverage of from about 10% to about 50%. Embodiment 13 is the framed air filter of any of embodiments 1-11 wherein the nonwoven web exhibits an area coverage of from about 20% to about 40%. Embodiment 14 is the framed air filter of any of embodiments 1-13 wherein the nonwoven web comprises a solidity of from about 2% to about 4%. Embodiment 15 is the framed air filter of any of embodiments 1-14 wherein the nonwoven web is chosen from the group consisting of a carded web, an air-laid web, a spun-bonded web, a spun-laced web, a melt-blown web, and laminates thereof.

Embodiment 16 is the framed air filter of any of embodiments 1-15 wherein the first, downstream face of the nonwoven web is thermally point-bonded to the first, upstream face of the microperforated film, at an area bond that is less than about 5%. Embodiment 17 is the framed air filter of any of embodiments 1-16 wherein the filter media is a pleated filter media in which the microperforated film and the nonwoven web are co-pleated layers. Embodiment 18 is the framed air filter of any of embodiments 1-17 further comprising a support grid that is that is bonded to an upstream face or a downstream face of the filter media. Embodiment 19 is the framed air filter of any of embodiments 1-18, wherein the filter media comprises a generally rectangular perimeter with four major edges and wherein the support frame comprises four major frame portions, with each major frame portion being mounted on one of the four major edges of the filter media. Embodiment 20 is the framed air filter of any of embodiments 1-19, wherein the microperforated film and/or the nonwoven web is an electret material. Embodiment 21 is the framed air filter of any of embodiments 1-20, wherein the microperforated film comprises informational indicia printed on the first, upstream face and/or the second, downstream face thereof. Embodiment 22 is the framed air filter of any of embodiments 1-21, wherein the framed air filter exhibits a particle Arrestance of at least about 30%. Embodiment 23 is the framed air filter of any of embodiments 1-22, wherein the framed air filter exhibits a Dust Holding Capacity of at least about 15 grams per 16×25 inch nominal size framed air filter.

Embodiment 24 is an air filter media comprising: a microperforated film comprising a first, upstream face and a second, downstream face and comprising a plurality of tapered microperforations extending through the microperforated film from the first, upstream face to the second, downstream, wherein the tapered microperforations comprise a wide end at the first, upstream face of the microperforated film and a narrow end at the second, downstream face of the microperforated film and wherein the wide ends of the tapered microperforations collectively provide the first, upstream face of the microperforated film with a % open area of from about 50% to about 95%; and, a nonwoven web positioned on the first, upstream face of the microperforated film with a first, downstream face of the nonwoven web in contact with the first, upstream face of the microperforated film, wherein the nonwoven web exhibits an area coverage of from about 10% to about 70%, and wherein the nonwoven web exhibits a solidity of from about 1% to about 10%. Embodiment 25 is the air filter media of embodiment 24, further comprising the features found in the air filter media of any of embodiments 1-18 and 20-21.

Embodiment 26 is a method of filtering at least some solid particles from a moving air stream, the method comprising: impinging a moving air stream onto an upstream side of the air filter media of any of embodiments 24 and 25, so that the moving air stream passes through the air filter media and exits through a downstream side of the filter media. Embodiment 26 is a method of filtering at least some solid particles from a moving air stream, the method comprising: impinging a moving air stream onto an upstream side of the framed air filter of any of embodiments 1-23, so that the moving air stream passes through the air filter media of the framed air filter and exits through a downstream side of the filter media.

Examples

Test Methods
Solidity
Solidity of a web can be determined by dividing the measured bulk density of a fibrous web by the density of the materials making up the solid portion of the web, by the following method or any suitable similar procedure. Bulk density of a web can be determined by first measuring the weight (e.g. of a 10-cm-by-10-cm section) of a web. Dividing the measured weight of the web by the web area provides the basis weight of the web, which is reported in g/m². Thickness of the web can be measured by obtaining (e.g., by die cutting) a 135 mm diameter disk of the web and measuring the web thickness with a 230 g weight of 100 mm diameter centered atop the web. The bulk density of the web is determined by dividing the basis weight of the web by the thickness of the web and is reported as g/m³. The solidity is then determined by dividing the bulk density of the web by the density of the material (e.g. polymer) comprising the solid fibers of the web. (The density of a polymer can be measured by standard means if the supplier does not specify material density.) Solidity is a dimensionless fraction which is usually reported in percentage. Loft is usually reported as 100% minus the solidity (e.g., a solidity of 3% equates to a loft of 97%).

Area Coverage

The area coverage exhibited by a nonwoven web can be obtained by optical inspection of a representative area of the web as discussed earlier herein.

ASHRAE Standard

ASHRAE Standard 52.2 as referred to herein is available from the American Society of Heating, Refrigerating, and Air-Conditioning Engineers (ASHRAE Customer Service; 1791 Tullie Circle, Atlanta Ga., 30329).

Microperforated Film

A microperforated film was produced in similar manner to the general methods discussed in U.S. Patent Application Publication 2012/0244314 to Scheibner. The film was made by contacting molten thermoplastic resin (polypropylene) with a tooling roll whose surface comprised a pattern complementary to the pattern to be formed in the film. The tooling roll was provided as part of a two-roll nip into which the molten thermoplastic resin was fed. The resulting film (after cooling and solidification) comprised a thin base layer with first and second sets of parallel ribs protruding therefrom, with a rib height of approximately 178 microns and a rib pitch (spacing) of approximately 378 microns. The total thickness of the film was thus the thickness of the base layer plus the height of the ribs. The thickness of the base layer was not recorded but was believed to be in the range of approximately 25 microns or less (i.e., sufficiently thin to allow portions of the base layer to be adequately melted and displaced by flame treatment). The ribs comprised a top-width of approximately 23 microns; the wall angle of the rib walls was approximately 9 degrees. The width of the ribs at their bases was thus approximately 73 microns. The first and second sets of parallel ribs thus collectively provided dead-end cavities (i.e., terminated by the base layer) arranged in a square array at a pitch of approximately 378 microns. The thus-produced film was subjected to flame treatment which successfully melted and displaced portions of the base layer so as to leave an open throat in the vast majority of the dead-end cavities. For most of the cavities, the throat was at least partially radially surrounded by a flange of the general type described earlier herein; however, the dimensions of the flange varied somewhat from cavity to cavity. It was estimated (by optical inspection) that the thus-formed throats comprised an average diameter in the range of about 250 microns. (Due to the flow dynamics of the melting-displacement process, the throats were typically generally circular, oval, or a like shape, although some variation was present).

In summary, the thus-formed microperforated film was of the general type depicted in FIG. 3 (portions of actual film samples are visible in the photomicrographs of FIGS. 4 and 5). The microperforated film comprised a % open area at the wide end of the microperforations of approximately 88%, and a % open area at the narrow end (i.e., as provided collectively by the throats of the microperforations) of approximately 35%. The ratio of the % open area provided at the wide end, to that provided at the narrow end, was thus in the range of approximately 2.5.

Nonwoven Web

Bicomponent sheath-core polyester staple fibers (high-melting polyester core; lower-melting co-polyester sheath) were obtained of the general type available from Stein Fibers, Albany, N.Y. The fibers were listed as having a nominal length of approximately 51 mm and as being 15 denier (corresponding to an average diameter of approximately 47 microns). Polypropylene staple fibers were obtained of the general type available from FiberVisions, Athens, Ga. The fibers were listed were listed as having a nominal length of approximately 51 mm and as being 30 denier (corresponding to an average diameter of approximately 67 microns). The fibers were blended at a ratio of approximately 60/40 weight % (of 15 denier fibers to 30 denier fibers) and were carded using conventional carding methods to form a mass of blended and intermingled fibers. The mass of fibers was then passed through an oven (set at approximately 160 degrees C.) for sufficient time to allow at least some of the fibers to bond to each other at their points of contact, thus consolidating the mass of fibers into a nonwoven web with sufficient integrity to be handled. The resulting web comprised an area density of approximately 30 grams per square meter and a solidity of approximately 2.7.

Filter Media

The above-described nonwoven web was laminated to the wide-end (upstream) face of the above-described microperforated film to form a filter media. This was done by forming the two substrates into a two-layer stack and passing the stack through a calendering nip. The nip comprised a metal backing roll and a metal calendering roll that comprised posts configured to provide an approximately 2 (area) % point-bonding pattern. The temperature of the metal rolls was set at approximately 87 degrees C. and a nip pressure in the range of approximately 700 kPa was used. This 2% bonding was sufficient to bond the nonwoven web and the microperforated film to each other so that they could be handled together, as a multilayer substrate. (Comparative examples were also generated comprising multilayer substrates in which the nonwoven was bonded to the narrow-end (downstream) face of the microperforated film rather than to the upstream face, as discussed below.)

Optical photomicrographs of representative samples of filter media were taken (from the upstream side). Two such photomicrographs shown in FIGS. 4 and 5, at slightly different magnifications (the exact magnifications were not recorded, but the known pitch spacing of the ribs (of approximately 378 microns) can be used to establish the size scale of these photomicrographs). The large area percentage of the microperforated film that is line-of-sight-visible through the overlying nonwoven web in these photomicrographs is evidence of the relatively low area coverage provided by the nonwoven web. It was estimated that in these samples the area coverage provided by the nonwoven web was in the range of 20-50%.

Framed Air Filters

Multilayer substrates as described above were formed into framed air filters by cutting sections of the substrates into rectangular pieces of approximately 60 cm×38 cm and applying conventional perimeter support frames around the perimeter thereof (so as to make filters of nominal 16×25 inch standard size). In most cases the frames were made of cardboard and were pinch frames (of the general type described in U.S. patent application Ser. No. 13/490,545, filed 7 Jun. 2012, and entitled Framed Air Filter with Offset Slot, and Method of Making), with the "open" end of the pinch frame facing downstream.

A representative Working Example was selected from the thus-made framed filters, and was subjected to testing in generally similar manner as outlined in ASHRAE Standard 52.2 (as specified in 2012), entitled Method of Testing General Ventilation Air-Cleaning Devices for Removal Efficiency by Particle Size. The test was run using a standard Loading Dust as specified in the ASHRAE Standard, and was run at a face velocity of approximately 295 feet per minute. The test was terminated at a pressure drop through the filter media of 0.5 inches of water. At the termination of the test, the Arrestance was calculated as the (mass) percentage of the total dust that was arrested by the air filter (i.e., that was prevented from passing through the filter) and is reported as a percentage. The Dust Holding Capacity was calculated as the mass of dust retained by the air filter (i.e., by weighing the air filter and comparing this to its pre-test weight) and is reported in grams (i.e., grams of dust per a filter of nominal size 16×25 inches).

Thus, in summary, this representative Working Example comprised a microperforated film positioned with the wide-end face oriented upstream (facing the incoming air stream in the ASHRAE test), with a nonwoven web positioned upstream of the microperforated film and in contact with the upstream face of the microperforated film. Along with the Working Example (W.E), three Comparative Example (C.E.) framed air filters were made and tested. In C.E. 1, a nonwoven web had been laminated to the narrow-end face of the microperforated film. This framed air filter was placed into the test fixture with the wide-end face of the microperforated film facing upstream (as in the Working Example) but with the nonwoven web being positioned downstream of the microperforated film. In C.E. 2, no nonwoven web was used; the framed air filter merely comprised a microperforated film with the wide-end face oriented upstream. In C.E, 3, no nonwoven web was used; the framed air filter merely comprised a microperforated film with the narrow-end face oriented upstream.

Figure 6:
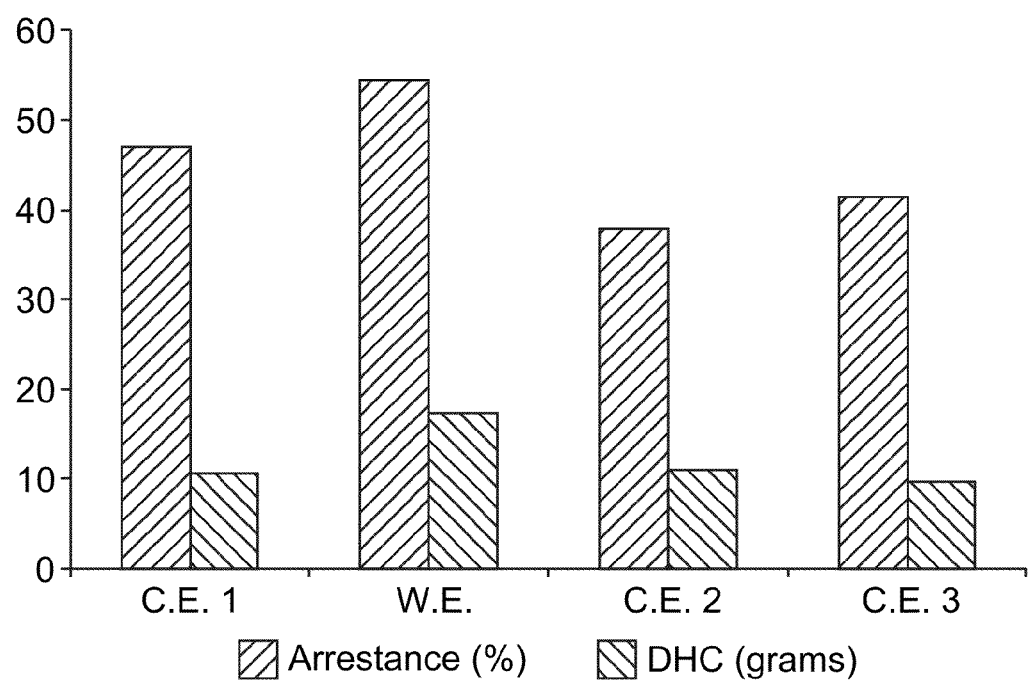
FIG. 6 presents experimentally obtained Arrestance and Dust Holding Capacity data for various air filter media configurations.

Arrestance and Dust Holding Capacity results as found for these samples are presented in FIG. 6. The scale on the left hand side of the Figure corresponds to % in the case of Arrestance, and to grams of dust (per filter) in the case of Dust Holding Capacity.

Comparison of the Working Example with Comparative Example 2 revealed that when the microperforated film was oriented with the wide ends of the microperforations facing upstream, providing a nonwoven web (even one as open and porous as that used in these Examples) upstream of the microperforated film resulted in a significant increase in both Arrestance and in Dust Holding Capacity (without causing the pressure drop to increase unacceptably). Comparison of Comparative Example 1 with Comparative Example 2 revealed that (with the microperforated film continuing to be oriented with the wide ends of the microperforations facing upstream), positioning a nonwoven web downstream of the microperforated film (that is, behind the film from the incoming airflow) resulted in almost no increase in Dust Holding Capacity, and a lessened increase in Arrestance. It was thus found that providing a nonwoven web upstream of the microperforated film in the manner disclosed herein, can provide significant enhancement in Arrestance and particularly in Dust Holding Capacity. This synergistic result is unexpected in view of the relatively large size of the microperforations (noting that in these Working Examples the throats were about 250 microns in diameter) and in view of the very open and porous nature of the nonwovens, that can be used in combination to achieve such an effect. While not wishing to be limited by theory or mechanism, it may be that then the microperforated films are oriented with the wide ends of the microperforations facing upstream, the presence of the fibers of the nonwoven upstream of the microperforations, may disrupt the flow of particles sufficiently to allow more of the particles to become trapped in the microperforations as if in a funnel.

The foregoing Examples have been provided for clarity of understanding only, and no unnecessary limitations are to be understood therefrom. The Examples are provided according to available records and are believed to be representative of work performed and results obtained. The tests and test results described in the Examples are intended to be illustrative rather than predictive, and variations in the testing procedure can be expected to yield different results. All quantitative values in the Examples are understood to be approximate in view of the commonly known tolerances involved in the procedures used.

It will be apparent to those skilled in the art that the specific exemplary elements, structures, features, details, configurations, etc., that are disclosed herein can be modified and/or combined in numerous embodiments. (In particular, any of the elements that are positively recited in this specification as alternatives, may be explicitly included in the claims or excluded from the claims, in any combination as desired.) All such variations and combinations are contemplated by the inventor as being within the bounds of the conceived invention not merely those representative designs that were chosen to serve as exemplary illustrations. Thus, the scope of the present invention should not be limited to the specific illustrative structures described herein, but rather extends at least to the structures described by the language of the claims, and the equivalents of those structures. To the extent that there is a conflict or discrepancy between this specification as written and the disclosure in any document incorporated by reference herein, this specification as written will control.

What is claimed is:

1. A framed air filter comprising:
   a filter media with an upstream side and a downstream side and a perimeter, wherein the filter media comprises:
   a microperforated film comprising a first, upstream face and a second, downstream face and comprising a plurality of tapered microperforations extending through the microperforated film from the first, upstream face to the second, downstream face,
   wherein the tapered microperforations comprise a wide end at the first, upstream face of the microperforated film and a narrow end at the second, downstream face of the microperforated film, wherein the narrow ends of the tapered microperforations exhibit a diameter of from about 150 microns to about 400 microns, and wherein the wide ends of the tapered microperforations collectively provide the first, upstream face of the microperforated film with a % open area of from about 50% to about 95%;
   and,
   a nonwoven filtration web positioned on the first, upstream face of the microperforated film with a first, downstream face of the nonwoven web in contact with the first, upstream face of the microperforated film and with the nonwoven filtration web being thermally point-bonded to the first, upstream face of the microperforated film, at an area bond that is less than about 5%,
   wherein the nonwoven web exhibits an area coverage of from about 20% to about 50%, wherein the nonwoven web exhibits a solidity of from about 1% to about 4%, wherein the nonwoven web exhibits an area density of from about 10 grams per square meter to about 50 grams per square meter, and wherein the nonwoven web exhibits an average fiber diameter of from about 30 microns to about 200 microns,
and,
a support frame surrounding the perimeter of the filter media.

2. The framed air filter of claim 1, wherein the wide ends of the tapered microperforations collectively provide the first, upstream face of the microperforated film with a % open area of from about 60%, to about 90%.

3. The framed air filter of claim 1, wherein the wide ends of the tapered microperforations collectively provide the first, upstream face of the microperforated film with a % open area of from about 70%, to about 90%.

4. The framed air filter of claim 1, wherein the narrow ends of the tapered microperforations collectively provide the second, downstream face of the microperforated film with a % open area of from about 20% to about 70%.

5. The framed air filter of claim 1, wherein the narrow ends of the tapered microperforations collectively provide the second, downstream face of the microperforated film with a % open area of from about 30% to about 60%.

6. The framed air filter of claim 1, wherein the plurality of tapered microperforations are present in the microperforated film at a density of from about 155 microperforations per square cm to about 1550 microperforations per square cm.

7. The framed air filter of claim 1, wherein the plurality of tapered microperforations are present in the microperforated film at a density of from about 310 microperforations per square cm to about 1240 microperforations per square cm.

8. The framed air filter of claim 1 wherein the nonwoven web comprises a solidity of from about 2% to about 4%.

9. The framed air filter of claim 1 wherein the nonwoven web is chosen from the group consisting of a carded web, an air-laid web, a spun-bonded web, a spun-laced web, a melt-blown web, and laminates thereof.

10. The framed air filter of claim 1 wherein the filter media is a pleated filter media in which the microperforated film and the nonwoven web are co-pleated layers.

11. The framed air filter of claim 1 further comprising a support grid that is that is bonded to an upstream face or a downstream face of the filter media.

12. The framed air filter of claim 1, wherein the filter media comprises a generally rectangular perimeter with four major edges and wherein the support frame comprises four major frame portions, with each major frame portion being mounted on one of the four major edges of the filter media.

13. The framed air filter of claim 1, wherein the microperforated film and/or the nonwoven web is an electret material.

14. The framed air filter of claim 1, wherein the microperforated film comprises informational indicia printed on the first, upstream face and/or the second, downstream face thereof.

15. The framed air filter of claim 1, wherein the framed air filter exhibits a particle Arrestance of at least about 30%.

16. The framed air filter of claim 1, wherein the framed air filter exhibits a Dust Holding Capacity of at least about 15 grams per 16×25 inch nominal size framed air filter.

17. An air filter media comprising:
   a microperforated film comprising a first, upstream face and a second, downstream face and comprising a plurality of tapered microperforations extending through the microperforated film from the first, upstream face to the second, downstream,
      wherein the tapered microperforations comprise a wide end at the first, upstream face of the microperforated film and a narrow end at the second, downstream face of the microperforated film, wherein the narrow ends of the tapered microperforations exhibit a diameter of from about 150 microns to about 400 microns, and wherein the wide ends of the tapered microperforations collectively provide the first, upstream face of the microperforated film with a % open area of from about 50% to about 95%;
   and,
   a nonwoven filtration web positioned on the first, upstream face of the microperforated film and with a first, downstream face of the nonwoven web in contact with the first, upstream face of the microperforated film and with the nonwoven filtration web being thermally point-bonded to the first, upstream face of the microperforated film, at an area bond that is less than about 5%,
      wherein the nonwoven web exhibits an area coverage of from about 20% to about 50%, wherein the nonwoven web exhibits a solidity of from about 1% to about 4%, wherein the nonwoven web exhibits an area density of from about 10 grams per square meter to about 50 grams per square meter, and wherein the nonwoven web exhibits an average fiber diameter of from about 30 microns to about 200 microns.

18. A method of filtering at least some solid particles from a moving air stream, the method comprising:
   impinging a moving air stream onto an upstream side of the air filter media of claim 17, so that the moving air stream passes through the air filter media and exits through a downstream side of the filter media.

* * * * *

UNITED STATES PATENT AND TRADEMARK OFFICE
CERTIFICATE OF CORRECTION

| | | |
|---|---|---|
| PATENT NO. | : 9,168,476 B2 | Page 1 of 1 |
| APPLICATION NO. | : 14/051596 | |
| DATED | : October 27, 2015 | |
| INVENTOR(S) | : Gustavo Castro | |

It is certified that error appears in the above-identified patent and that said Letters Patent is hereby corrected as shown below:

Specification

Column 7
Line 26, Delete "on). to" and insert -- on). To --, therefor.

Claims

Column 15
Line 51, In Claim 11, delete "that is that is" and insert -- that is --, therefor.

Signed and Sealed this
Twenty-fourth Day of May, 2016

Michelle K. Lee
*Director of the United States Patent and Trademark Office*